(12) United States Patent
Shi et al.

(10) Patent No.: US 9,888,161 B2
(45) Date of Patent: Feb. 6, 2018

(54) GENERATION APPARATUS AND METHOD FOR EVALUATION INFORMATION, ELECTRONIC DEVICE AND SERVER

(71) Applicant: Sony Corporation, Tokyo (JP)

(72) Inventors: Jun Shi, Beijing (CN); Qing Yang, Beijing (CN)

(73) Assignee: Sony Mobile Communications Inc., Tokyo (JP)

( * ) Notice: Subject to any disclaimer, the term of this patent is extended or adjusted under 35 U.S.C. 154(b) by 109 days.

(21) Appl. No.: 14/889,324

(22) PCT Filed: Aug. 5, 2015

(86) PCT No.: PCT/IB2015/055952
§ 371 (c)(1),
(2) Date: Nov. 5, 2015

(87) PCT Pub. No.: WO2016/079609
PCT Pub. Date: May 26, 2016

(65) Prior Publication Data
US 2016/0360079 A1    Dec. 8, 2016

(30) Foreign Application Priority Data

Nov. 18, 2014 (CN) .......................... 2014 1 0655705

(51) Int. Cl.
*G06K 9/00* (2006.01)
*H04N 5/232* (2006.01)
(Continued)

(52) U.S. Cl.
CPC ............... *H04N 5/232* (2013.01); *G06T 7/90* (2017.01); *H04N 1/00159* (2013.01);
(Continued)

(58) Field of Classification Search
CPC .... G06C 50/01; G06C 30/02; H04N 1/00161; G06F 17/30029; G06F 17/30247; G06K 9/00677; G06K 9/00536
See application file for complete search history.

(56) References Cited

U.S. PATENT DOCUMENTS

2003/0074373 A1    4/2003 Kaburagi et al.
2009/0284621 A1    11/2009 Oks et al.
(Continued)

FOREIGN PATENT DOCUMENTS

WO        2014/020816 A1    2/2014

OTHER PUBLICATIONS

International Search Report and Written Opinion for corresponding International Application No. PCT/IB2015/055952 dated Aug. 11, 2015.

*Primary Examiner* — Li Liu
(74) *Attorney, Agent, or Firm* — Renner, Otto, Boisselle & Sklar, LLP

(57) ABSTRACT

Embodiments of the present disclosure provide a generation apparatus and method for evaluation information, an electronic device and a server. The generation apparatus for evaluation information includes: an acquiring unit configured to acquire an image to be evaluated; an analyzing unit configured to analyze the image to be evaluated according to pre-obtained information; and a generating unit configured to generate evaluation information of the image to be evaluated according to an analysis result of the analyzing unit. The evaluation information may be provided to a user for reference before shooting and/or publishing a photo, so that the user may adjust a content and/or a parameter of shooting, decide whether to shoot and/or publish the photo, and decide people to whom the photo is published, thereby improving user experiences.

18 Claims, 5 Drawing Sheets

(51) Int. Cl.
*H04N 1/00* (2006.01)
*G06T 7/90* (2017.01)

(52) U.S. Cl.
CPC ..... *H04N 1/00161* (2013.01); *H04N 1/00307* (2013.01); *H04N 5/23222* (2013.01); *G06T 2207/10024* (2013.01)

(56) References Cited

U.S. PATENT DOCUMENTS

| | | | | |
|---|---|---|---|---|
| 2009/0319288 A1* | 12/2009 | Slaney | ................ | G06Q 10/10 705/1.1 |
| 2013/0148864 A1* | 6/2013 | Dolson | ............ | G06F 17/30265 382/115 |
| 2014/0003737 A1* | 1/2014 | Fedorovskaya | ........ | G06Q 50/01 382/276 |
| 2014/0006395 A1* | 1/2014 | Wolfe | ................ | G06Q 50/01 707/732 |
| 2014/0006420 A1* | 1/2014 | Sparrow | ........... | G06F 17/30029 707/748 |
| 2014/0019264 A1* | 1/2014 | Wachman | .......... | G06Q 30/0276 705/14.72 |
| 2014/0126826 A1 | 5/2014 | Yabu et al. | | |
| 2014/0328570 A1* | 11/2014 | Cheng | ................ | G11B 27/10 386/241 |
| 2015/0081713 A1* | 3/2015 | Alonso | ................ | G06Q 10/109 707/738 |
| 2015/0370830 A1* | 12/2015 | Murphy-Chutorian | ......... | G06F 17/30256 707/748 |
| 2016/0019411 A1* | 1/2016 | Bart | ................ | G06K 9/00221 382/118 |
| 2016/0042253 A1* | 2/2016 | Sawhney | ............ | G06K 9/6255 382/190 |
| 2016/0073036 A1* | 3/2016 | Chen | ................ | H04N 5/23293 348/231.2 |
| 2016/0188600 A1* | 6/2016 | Owens | ................ | G06Q 30/02 707/734 |

* cited by examiner

GENERATION APPARATUS AND METHOD FOR EVALUATION INFORMATION, ELECTRONIC DEVICE AND SERVER

Priority and/or the benefit of Chinese Patent Application No. 201410655705.7, filed Nov. 18, 2014, and of PCT Patent Application No. PCT/IB2015/055952, filed Aug. 5, 2015, are claimed. The entire disclosures of these applications are hereby incorporated by reference.

TECHNICAL FIELD

The present disclosure relates to the field of communications, and in particular, to a generation apparatus and method for evaluation information, an electronic device and a server.

BACKGROUND ART

Currently, as the development of communication technologies, electronic devices, such as smart mobile phones, tablet computers, etc., are widely used, and besides the original functions, such as communication, and entertainment, etc., the functions and applications of the electronic devices have expanded continuously. In recent years, such social applications as WeChat, Twitter, and Facebook, etc., are widely used in these electronic devices. With these applications, photos may be shared to friends, colleagues and family members, and the friends, colleagues and family members may evaluate and discuss the shared photos.

SUMMARY OF THE DISCLOSURE

Currently, evaluation and discussion of photos are performed after the photos are shot and published on a network, and before the photos are shot and published, a user cannot predict possible evaluation of the photos after the photos are published.

Embodiments of the present disclosure provide a generation apparatus and method for evaluation information, an electronic device and a server. Evaluation information may be provided to a user for reference before shooting and/or publishing a photo, so that the user may adjust a content and/or a parameter of shooting, decide whether to shoot and/or publish the photo, and decide people to whom the photo is published, e.g., shared, furnished, sent, copied, transmitted, etc., thereby improving user experiences.

According to a first aspect of the embodiments of the present disclosure, there is provided a generation apparatus for evaluation information, including: an acquiring unit configured to acquire an image to be evaluated; an analyzing unit configured to analyze the image to be evaluated according to pre-obtained information; and a generating unit configured to generate evaluation information of the image to be evaluated according to an analysis result of the analyzing unit.

According to a second aspect of the embodiments of the present disclosure, there is provided an electronic device, including the apparatus as described according to the first aspect of the embodiments of the present disclosure.

According to a third aspect of the embodiments of the present disclosure, there is provided a server, including the apparatus as described according to the first aspect of the embodiments of the present disclosure.

According to a fourth aspect of the embodiments of the present disclosure, there is provided a generation method for evaluation information, including: acquiring an image to be evaluated; analyzing the image to be evaluated according to pre-obtained information; and generating evaluation information of the image to be evaluated according to an analysis result.

An advantage of the embodiments of the present disclosure exists in that the image to be evaluated may be analyzed according to the pre-obtained information, and the evaluation information of the image to be evaluated may be generated according to an analysis result. In this way, the evaluation information may be provided to a user for reference before shooting and/or publishing a photo, so that the user may adjust a content and/or a parameter of shooting, decide whether to shoot and/or publish the photo, and decide people to whom the photo is published, thereby improving user experiences.

With reference to the following description and drawings, the particular embodiments of the present disclosure are disclosed in detail, and principles of the present disclosure and the manners of use are indicated. It should be understood that the scope of the embodiments of the present disclosure is not limited thereto. The embodiments of the present disclosure contain many alternatives or alterations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the terms include(s), comprise(s), including, and comprising when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size, e.g., made larger in relation to other parts than in an exemplary device actually made according to the disclosure. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION OF THE DISCLOSURE

The interchangeable terms "electronic device" and "electronic apparatus" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smartphones, portable communication devices or the like.

In the present application, embodiments of the disclosure are described primarily in the context of a portable electronic device in the form of a mobile telephone (also referred to as "mobile phone"). However, it shall be appreciated that the disclosure is not limited to the context of a mobile telephone and may relate to any type of appropriate electronic device. Examples of such an electronic device include a camera, a video camera, a tablet computer, a smart watch, a pair of smart glasses, a head wearable device, a wearable device, fixed line telephone, a medium player, a gaming device, a PDA, and a computer, etc.

Several exemplary embodiments of the present disclosure are described as follows with reference to the drawings.

Embodiment 1

Figure 1:
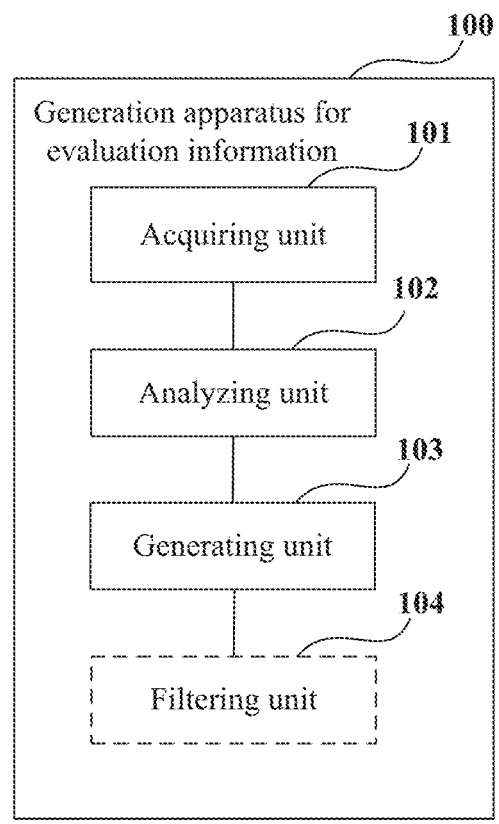
FIG. 1 is a schematic diagram of the structure of a generation apparatus for evaluation information of Embodiment 1 of the present disclosure.

An embodiment of the present disclosure provides a generation apparatus for evaluation information. FIG. 1 is a schematic diagram of the structure of the generation apparatus for evaluation information of Embodiment 1 of the present disclosure. As shown in FIG. 1, the generation apparatus 100 for evaluation information includes an acquiring unit 101, an analyzing unit 102 and a generating unit 103.

The acquiring unit 101 is configured to acquire an image to be evaluated.

The analyzing unit 102 is configured to analyze the image to be evaluated according to pre-obtained information.

The generating unit 103 is configured to generate evaluation information of the image to be evaluated according to an analysis result of the analyzing unit.

It can be seen from the above embodiment that the image to be evaluated is analyzed according to the pre-obtained information, and evaluation information of the image to be evaluated is generated according to an analysis result. In this way, the evaluation information may be provided to a user for reference before shooting and/or publishing a photo, so that the user can adjust a content and/or a parameter of shooting, decide whether to shoot and/or publish the photo, and decide people to whom the photo is published, thereby improving the user's experience.

In this embodiment, the acquiring unit 101 is configured to acquire an image to be evaluated, wherein, the image to be evaluated may be an image to be shot and/or published by the user, that is, an image that has not been evaluated. For example, the image to be evaluated may be a preview image in a viewfinder, or a shot image that has not been published, or an image obtained otherwise, such as an image downloaded from a network. A form of the image to be evaluated and a method for obtaining the image to be evaluated by the acquiring unit are not limited in the embodiments of the present disclosure.

In this embodiment, the description is exemplified by taking a preview image as an example. However, the embodiments of the present disclosure are not limited thereto.

In this embodiment, the acquiring unit 101 includes, for example, a camera unit. The camera unit may include such elements as a lens, a viewfinder, and an image sensor, etc. A user aligns the lens with an object to be shot, so as to obtain a preview image within the range of the viewfinder. The acquiring unit may also obtain a preview image from another component having a function of image pickup. The manner of acquiring a preview image by the acquiring unit 101 is not limited in the embodiments of the present disclosure.

In this embodiment, the user may align the lens with an object to be shot, so as to obtain a preview image within a range of the viewfinder. For example, the user may shoot a scene or other people, also the user may shoot himself or herself. When the user shoots himself or herself, the preview image includes an image of himself or herself.

In this embodiment, the analyzing unit 102 is configured to analyze the preview image according to pre-obtained information. The pre-obtained information may be, for example, pre-collected information on preference of an image of at least one user, and may also be a pre-established evaluation criteria (the evaluation criteria may be an evaluation standard or may be obtained, for example, as is described further herein), the evaluation criteria being established by, for example, statistically analyzing the information on preference of an image of at least one user. Statistically analyzing may be carried out in various ways, many of which are known. Several examples are provided herein. One example of statistical analyzing may be to count information, such as how many people prefer dark images, as compared to how many people prefer light images, and so on, white balance characteristics of an image as preferred by people, position of persons or objects in an image as preferred by people, and so on, several examples of which are described further below For example, history data may be collected by a server to establish the evaluation criteria, and the generation apparatus 100 for evaluation information may download the evaluation criteria from the server.

In this embodiment, the at least one user may include a specific group of people or some specific people.

When the at least one user includes a specific group of people, the specific group of people may be, for example, a user himself/herself using the generation apparatus 100, all contacts of the user, e.g., people in a user's electronic device phone book or contacts list, or all friends of the user in a social application or website, or all users using the generation apparatus 100. When the at least one user includes some specific people, the specific people may be, for example, a closest family member or friend of a user using the generation apparatus 100, or a celebrity or star whom the user is interested in, or a famous photographer, artist, or painter, or a photographed person appearing in the preview image.

For example, when the at least one user includes a famous photographer, artist, or painter, image-based big data analytics may be performed on previous articles of the photographer, artist, or painter, so as to statistically obtain personal profiles of each photographer, artist, or painter with respect to colors, compositions, ray brightness, exposure times, sizes of apertures, scene depths, post-processing methods and other special photographing skills and photographing habits, and calculate and establish an evaluation criteria for an image of the photographer, artist, or painter based on the profiles. Thus, the preview image may be analyzed according to the evaluation criteria, so as to generate evaluation information on the preview image of the photographer, artist, or painter, for reference by the user, so that parameters and means of photographing may be adjusted, thereby improving photographing qualities.

For example, in case that the at least one user includes a photographed person appearing in the preview image, evaluation information of the photographed person needing to be acquired may be selected by automatically identifying the face of the person or clicking a corresponding face on a filter displaying a preview image by the user, and an identity of the photographed person is determined after an image of the face of the person is obtained. By statistically analyzing in advance photos previously published by the photographer and evaluation information of the photographer on other photos, an evaluation criteria of the photographed person on an image is established, and evaluation information of the photographed person on the preview image is generated by analyzing the preview image by means of the evaluation criteria, for reference by the user, so as to assist the user in shooting a photo satisfying the photographed person. For example, if the generated evaluation information is "it would be better if it is brighter", the user may adjust a shooting parameter according to the evaluation information, such as suitably enlarging the aperture, extending the exposure time, or increasing the ISO, etc.

For example, in case that the at least one user includes the user himself/herself using the generation apparatus 100, preference of an image of the user himself/herself may be statistically analyzed based on a time axis, to analyze a tendency of change of his/her preference and predict his/her possible preference a certain period time later, so that the preview image can be analyzed according to the predicted information on preference, and the evaluation information is generated. In this way, interests of shooting may be increased by generating the evaluation information based on the predicted information on preference, thereby further increasing user experiences. For example, a tendency of change of the preference of photographing of the user may be analyzed based on a time axis, and an obvious seasonal change of preference of photographing colors may be statistically obtained. For example, such warm colors as red and yellow are preferred in winter, and such cool colors as blue and green are preferred in summer. Hence, when the user shoots photos of red subjects at a certain time, the generated evaluation information may be "I am in the winter, this photo is praised, and warms my heart!"

In this embodiment, the information on preference of an image of the at least one user includes, for example, information on preference of at least one of a content, a color, a color temperature, a contrast, a composition, brightness, and saturation, of an image.

In this embodiment, items included in the information on preference may be set as demanded by the user using the generation apparatus for evaluation information, and particular contents of the information on preference and the number of users related to and/or involved in the pre-obtained information are not limited in the embodiments of the present disclosure.

For example, the at least one user may include a friend "Tom", and his information on preference of a content and color of an image is as shown in Table 1 below:

TABLE 1

| User | Most preferred | Most nonpreferred |
|---|---|---|
| Tom | Sunshine | Haze |
| | Trees, natural scene | A severe face |
| | Face of a child | Traffic jam |
| | Foods | Dirty roads |
| | Colorful | Grey |

For example, the at least one user may include all users in a group A, and information on preference of a content and color of an image of the group A is as shown in Table 2 below:

TABLE 2

| User | Most preferred | Most nonpreferred |
|---|---|---|
| Group A | Bright | Dense buildings |
| | Colorful | A severe face |
| | A sport scenario | Traffic jam |
| | Foods | A sentence of over five words |
| | Trees, natural scene | Dirty roads |

In this embodiment, for color temperatures of images in the information on preference, images of high color temperatures, for example, photos with cyan or cold light scenario, such as a scenario with snow, a scenario under a spotlight, and a scenario under an indoor fluorescent lamp, may be preferred by some people, while images of low color temperatures, for example, photos with red, such as a sunset scenario, and a scenario under an indoor incandescent lamp, may be preferred by some other people.

In this embodiment, for contrast of images in the information on preference, sharp-edge photos of high contrast may be preferred by some people, while smooth and soft photos may be preferred by some other people.

In this embodiment, for compositions of images in the information on preference, there may be many types of styles of compositions. For example, a person is at the middle, a person is at a corner, a facial feature, standing, walking, sitting, horizontal, vertical, and inclination, etc. And different styles of compositions may be preferred by different people.

In this embodiment, for brightness in the information on preference, it may include such scenarios as darkness, low illumination, being under sunshine, being indoor, and being outdoor, etc. And different brightness scenarios may be preferred by different people.

In this embodiment, for saturation in the information on preference, colorful photos may be preferred by some people, light photos may be preferred by some other people, and black and white photos may be preferred by some yet other people.

In this embodiment, the information on preference of the at least one user may be uploaded by the user, and may also be obtained by collecting the evaluation of various images of the user.

In this embodiment, the pre-obtained information may be, for example, an evaluation criteria established by statistically analyzing information on preference of an image of at least one user. Any existing algorithm may be used in establishing an evaluation criteria by data statistical analysis, and a method for establishing an evaluation criteria is not limited in the embodiments of the present disclosure.

For example, for all 50 users in a group X, 100 photos are shared in a week, 60 of which are evaluated as "like", and 40 of which are evaluated as "dislike". Common components are extracted respectively from the 60 and 40 photos, which are taken as characteristic information on "like" or "dislike", and 30% are taken as a threshold value of extracted commonness. For example, if 50% of the 60 photos have natural scene, and 30% of them are bright, and 50% of the 40 photos related to traffic jam, and 30% of them are dark, then sunshine and brightness are taken as characteristic information on "like" of the group X, and traffic jam and darkness are taken as characteristic information on "dislike" of the group X.

In this embodiment, such parameters as the number of users and periods involved in the statistical analysis, and percentage threshold value of the extracted commonness, etc., may be set as demanded, which are not limited in the embodiments of the present disclosure.

In this embodiment, corresponding to the information on preference, the related information of the preview image analyzed by the analyzing unit 102 may also include at least one of a content, a color, a color temperature, a contrast, a composition, brightness, and saturation, of the preview image. For example, if the information on preference includes the information on preference of the content, the color, and the brightness of the image, the related information of the preview image analyzed by the analyzing unit includes the content, the color, and the brightness of the preview image. A structure of the analyzing unit 102 of the embodiment will be illustrated below.

Figure 2:
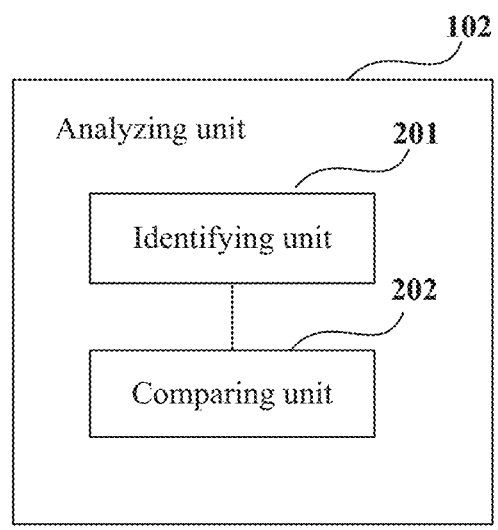
FIG. 2 is a schematic diagram of the structure of an analyzing unit 102 of Embodiment 1 of the present disclosure.

FIG. 2 is a schematic diagram of the structure of the analyzing unit 102 of Embodiment 1 of the present disclosure. As shown in FIG. 2, the analyzing unit 102 includes an identifying unit 201 and a comparing unit 202.

The identifying unit 201 is configured to identify the preview image, so as to obtain related information of the preview image.

The comparing unit 202 is configured to compare the related information of the preview image and the pre-obtained information, so as to obtain a matching degree between the related information of the preview image and the pre-obtained information.

Thus, the generating unit 103 generates the evaluation information of the preview image according to the matching degree between the related information of the preview image and the pre-obtained information.

In this embodiment, the identifying unit 201 may use any existing method to identify the preview image and obtain related information. For example, contents in the preview image may be obtained by using such methods as image identification based on an edge, and a template matching standard, etc. And such photographing parameters as a color temperature, a contrast, a composition, brightness, and saturation, may be obtained by analysis, and may also be obtained from video camera data recorded while recording the preview image.

In this embodiment, the comparing unit 202 is configured to compare the related information of the preview image and the pre-obtained information, so as to obtain a matching degree between the related information of the preview image and the pre-obtained information. A method for obtaining the matching degree may be determined as actually demanded.

For example, if the pre-obtained information on preference of the user "Tom" includes information on preference of a content and color of the image, as shown in Table 1, the comparing unit 202 compares the content of the preview image with the content of the image in Table 1, and compares the color of the preview image with the color of the image in Table 1. If the content or color of the preview image contains 3 or more of the contents or colors that are "like" in Table 1, it may be deemed that a matching degree between the content and color of the preview image and the content and color that are preferred by Tom may be "80". If the content or color of the preview image contains 1-2 of the contents or colors that are "like" in Table 1, it may be deemed that a matching degree between the content and color of the preview image and the content and color that are preferred by Tom may be "60". If neither the content and color of the preview image contain the contents and colors that are "like" in Table 1, nor contain the contents and colors that are "dislike" in Table 1, it may be deemed that the matching degree may be "40". If the content and color of the preview image contain 1-2 of the contents and colors that are "dislike" in Table 1, it may be deemed that the matching degree may be "20". If the content and color of the preview image contain 3 or more of the contents and colors that are "dislike" in Table 1, it may be deemed that the matching degree is "0".

For example, if pre-obtained information on preference of an image of a user "Jerry" includes information on preference of saturation of the image, a value of his preferred saturation is "80", and a value of saturation of the preview image is "60", it may be deemed that a matching degree between the saturation of the preview image and the preferred saturation of Jerry is 60/80=75%.

In this embodiment, if the information on preference includes various types of information, weights occupied by the various types of information may be set as demanded in calculating the matching degree. For example, if the information on preference includes a content and saturation, weights of them may be set as 70% and 30% respectively in calculating the matching degree.

In this embodiment, information needing to be identified and matched may be set as demanded by the user. For example, the user pays more attention to evaluation of others on the contents of the image, and the analyzing unit 102 may identify and match the contents of the image.

The generating unit 103 is configured to generate the evaluation information of the preview image according to an analysis result of the analyzing unit 102. For example, the evaluation information of the preview image may be generated according to the matching degree between the related information of the preview image and the pre-obtained information. Fox example, Different evaluation information may be generated for different matching degrees.

In this embodiment, for users related to and/or involved in the pre-obtained information, evaluation information may be generated for a certain group of people or a certain person. For example, for the user "Tom", evaluation information generated for different matching degrees is as shown in Table 3.

TABLE 3

| User | Matching degree | Evaluation information |
|------|-----------------|------------------------|
| Tom  | 80%             | I like                 |
|      | 60%             | I feel just so so      |
|      | 30%             | I do not like          |

The above matching degrees and corresponding evaluation information are illustrative only, and a user may set them as demanded.

In this embodiment, evaluation information of all users of each group of people or a certain group of people may be statistically analyzed, so as to generate evaluation information having statistical information. For example, for all contacts in the application WeChat, evaluation information of all contacts are statistically analyzed, so as to obtain evaluation information having statistical information. For example, after the statistically analyzing, evaluation information of "87% of the contacts of the WeChat dislike the image" is generated.

In this embodiment, the evaluation information having statistical information may be generated in combination with evaluation information for a specific user. For example, "87% of the contacts of the WeChat dislike the image; Tom: I like" is generated.

In this embodiment, when the user shoots himself or herself, the generating unit 103 may generate evaluation information of the image including the user himself or herself. Therefore, the user may feel more interesting, and the user experiences can be improved further.

In this embodiment, the generation apparatus for evaluation information 100 may further include a filtering unit 104.

The filtering unit 104 is configured to filter the generated evaluation information of the preview image according to a predefined rule.

In this embodiment, the filtering unit 104 may be optional, which is denoted by dotted lines in FIG. 1.

In this way, by providing the filtering unit 104 to filter the generated evaluation information, pertinent evaluation information may be flexibly provided as demanded by a user, thereby further improving user experiences.

In this embodiment, the user may set a rule for filtering as demanded by himself/herself.

For example, the user may filter evaluation information of a closest friend or a friend or a family member most frequently contacted socially, and may also filter evaluation information of a person appearing in the preview image, and such evaluation information may possibly be more concerned by the user. For example, if the photographed person in the preview image is a friend A of the user, evaluation information on the preview image of the friend A may be filtered, so as to be provided to the user.

For example, the user may also filter positive or negative evaluation information according to his/her mood, thereby further improving user experiences.

For example, the evaluation information may further be filtered according to position information of the preview image. For example, evaluation information of another user relatively close to the user may be filtered.

In this embodiment, a manner of setting the rule for filtering by the user may be, for example, activating a filtering menu, inputting a filtering condition, or selecting a filtering object in the menu, and is not limited in the embodiment of the present disclosure. It can be seen from the above embodiment that by analyzing the preview image according to the pre-obtained information and generating the evaluation information of the preview image according to the analysis result, the evaluation information may be provided to a user for reference before shooting and/or publishing a photo, so that the user may adjust a content and/or a parameter of shooting, decide whether to shoot and/or publish the photo, and decide people to whom the photo is published, thereby improving user experiences.

Embodiment 2

Figure 3:
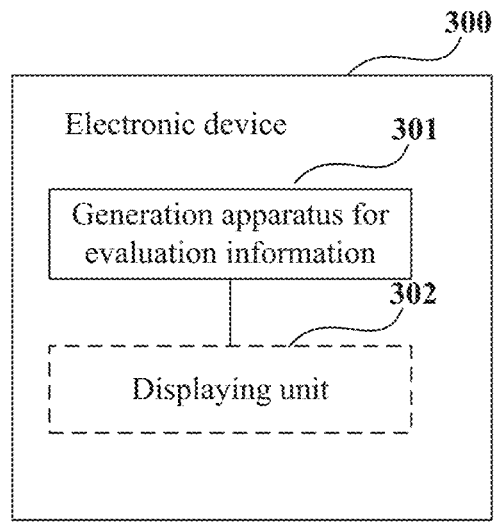
FIG. 3 is a schematic diagram of the structure of an electronic device of Embodiment 2 of the present disclosure.

This embodiment provides an electronic device. FIG. 3 is a schematic diagram of the structure of the electronic device of this embodiment. As shown in FIG. 3, the electronic device 300 includes a generation apparatus for evaluation information 301 and a displaying unit 302.

The generation apparatus for evaluation information 301 has all components and functions of the generation apparatus for evaluation information 100 of Embodiment 1, which shall not be described herein any further.

The displaying unit 302 is configured to display the evaluation information of the image to be evaluated on the preview image.

In this embodiment, the displaying unit 302 is optional, which is denoted by dotted line in FIG. 3.

In this embodiment, the displaying unit is, for example, a touch screen, which may be taken as a screen of a viewfinder to display the preview image of the image to be evaluated.

In this embodiment, a position of the displayed evaluation information on the preview image may be set as demanded. For example, it may be provided at a corner not affecting the whole image.

Figure 4:
FIG. 4 is a schematic diagram of displaying evaluation information by the electronic device of Embodiment 2 of the present disclosure.

FIG. 4 is a schematic diagram of displaying evaluation information by the electronic device of this embodiment. As shown in FIG. 4, evaluation information having statistical information, e.g., "87% of the WeChat contacts dislike", is displayed at an upper right corner of the preview image displayed by the displaying unit. Furthermore, the evaluation information may further include a more detailed content, such as "it would look better if there was more cloud in the photo", or "friends in Facebook would praise if the photo was taken in a whole view", etc.

Figure 5:
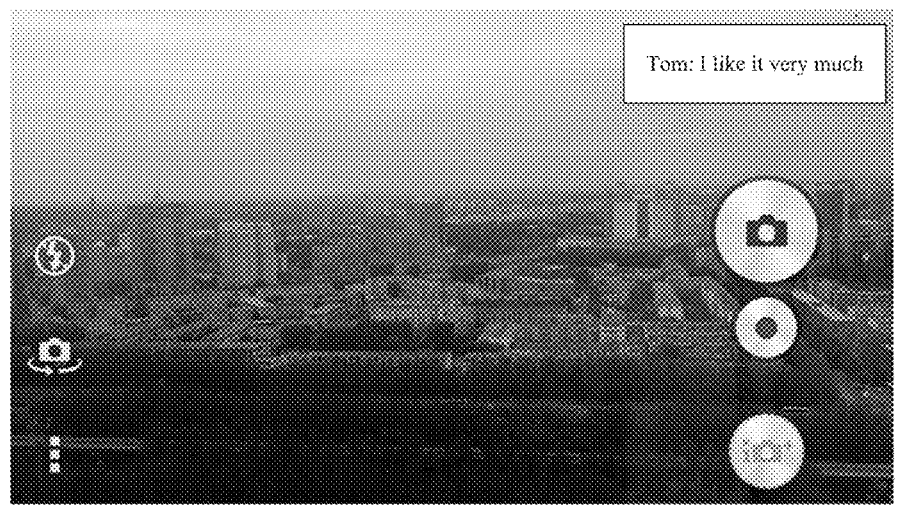
FIG. 5 is another schematic diagram of displaying evaluation information by the electronic device of Embodiment 2 of the present disclosure.

FIG. 5 is another schematic diagram of displaying evaluation information by the electronic device of this embodiment. As shown in FIG. 5, evaluation information of a certain user, such as "Tom: I like it very much", is displayed at an upper right corner of the preview image displayed by the displaying unit. And a head portrait corresponding to a name may be displayed while the name is displayed.

Figure 6:
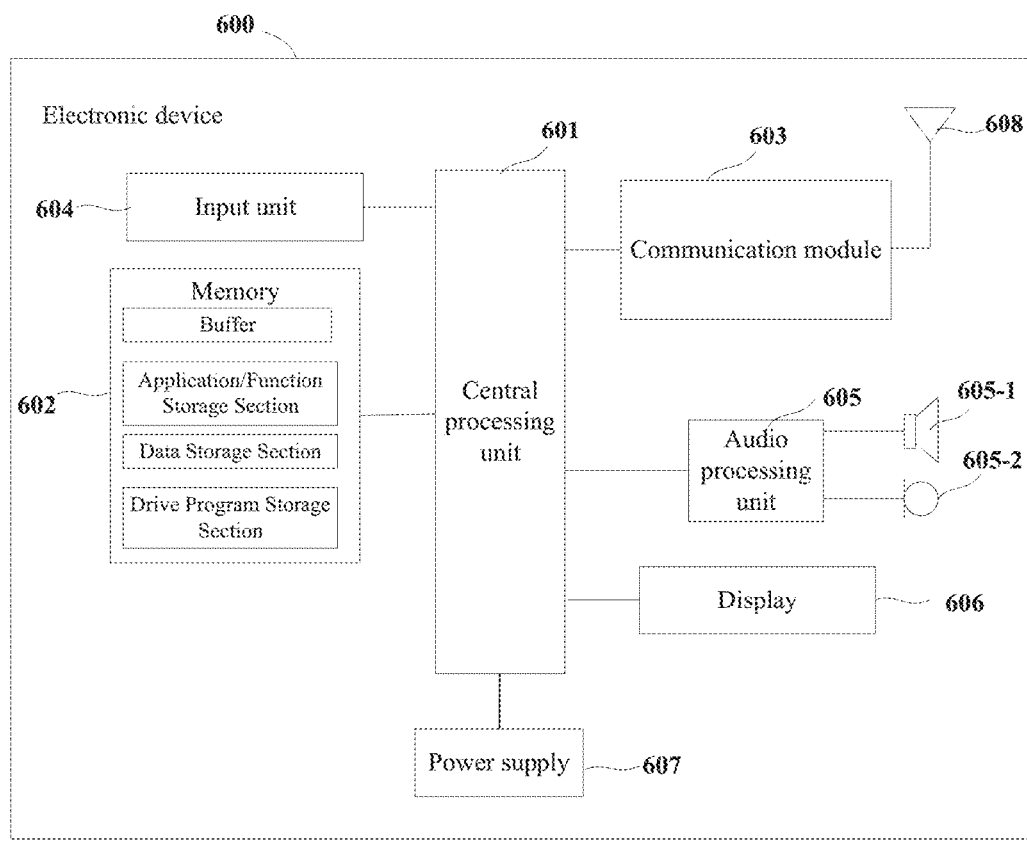
FIG. 6 is a block diagram of the systematic structure of the electronic device of Embodiment 2 of the present disclosure.

FIG. 6 is a block diagram of a systematic structure of the electronic device of this embodiment. As shown in FIG. 6, the electronic device 600 may include a central processing unit 601 and a memory 602 being coupled to the central processing unit 601. It should be noted that such a figure is exemplary only, and other types of structures may be used to supplement or replace this structure for the realization of telecommunications functions or other functions.

In a mode of implementation, functions of a control apparatus may be integrated into the central processing unit 601. The central processing unit 601 may be configured to acquire an image to be evaluated, analyze the image to be evaluated according to pre-obtained information and generate evaluation information of the image to be evaluated according to an analysis result.

For example, the step of analyzing the image to be evaluated according to pre-obtained information includes: identifying the image to be evaluated, so as to obtain related information of the image to be evaluated; comparing the related information of the image to be evaluated and the pre-obtained information, so as to obtain a matching degree between the related information of the image to be evaluated and the pre-obtained information; and generating the evaluation information of the image to be evaluated according to the matching degree between the related information of the image to be evaluated and the pre-obtained information.

For example, the central processing unit 601 may further be configured to filter the generated evaluation information of the image to be evaluated according to a predefined rule.

For example, the pre-obtained information includes a pre-established evaluation criteria, the pre-established evaluation criteria being established by statistically analyzing information on preference of an image of at least one user.

For example, the related information of the image to be evaluated includes at least one of a content, a color, a color temperature, a contrast, a composition, brightness, and saturation, of the preview image.

For example, the information on preference of an image of at least one user includes information on preference of at least one of a content, a color, a color temperature, a contrast, a composition, brightness, and saturation, of an image.

In another mode of implementation, the generation apparatus for evaluation information and the central processing unit 601 may be configured separately. For example, the generation apparatus for evaluation information may be configured as a chip connected to the central processing unit 601, with the functions of the generation apparatus for evaluation information being realized under control of the central processing unit.

As shown in FIG. 6, the electronic device 600 may further include a communication module 603, an input unit 604, an audio processing unit 605, a loudspeaker 605-1, a microphone 605-2, a display 606, a power supply 607, and an antenna 608. It should be noted that the electronic device 600 does not necessarily include all the parts shown in FIG. 6; furthermore, the electronic device 600 may include other parts not shown in FIG. 6, and the prior art may be referred to for these parts.

As shown in FIG. 6, the central processing unit 601 is sometimes referred to as a controller or control, and may include a microprocessor or other processor devices and/or logic devices. The central processing unit 601 receives input and controls operations of every components of the electronic device 600.

For example, the memory 602 may be, for example, one or more of a buffer memory, a flash memory, a hard drive, a mobile medium, a volatile memory, a nonvolatile memory, or other suitable devices, and may store the above-mentioned information and a program to process the information. And the central processing unit 601 may execute the program stored in the memory 602, so as to realize information storage or processing, etc. Functions of other parts are similar to those of the prior art, which shall not be described herein any further. The parts of the electronic device 600 may be realized by specific hardware, firmware, software, or any combination thereof, without departing from the scope of the present disclosure.

It can be seen from the above embodiment that the preview image is analyzed according to the pre-obtained information, and evaluation information of the preview image is generated according to an analysis result. In this way, the evaluation information may be provided to a user for reference before shooting and/or publishing a photo, so that the user may adjust a content and/or a parameter of shooting, decide whether to shoot and/or publish the photo, and decide people to whom the photo is published, thereby improving user experiences.

Embodiment 3

Figure 7:
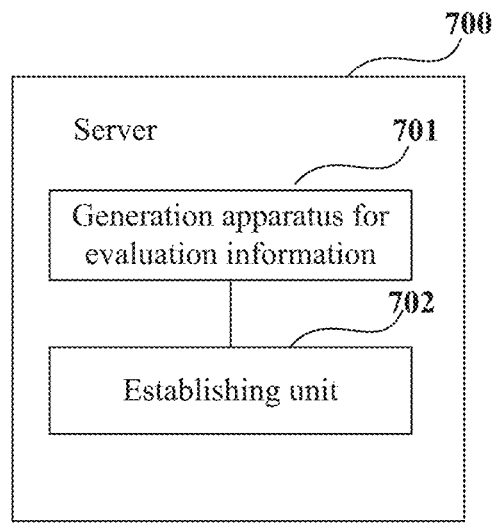
FIG. 7 is a schematic diagram of the structure of a server of Embodiment 3 of the present disclosure.

An embodiment of the present disclosure further provides a server. FIG. 7 is a schematic diagram of the structure of the server of this embodiment. As shown in FIG. 7, the server 700 includes a generation apparatus for evaluation information 701. The generation apparatus for evaluation information 701 has all components and functions of the generation apparatus for evaluation information 100 of Embodiment 1, which shall not be described herein any further.

In this embodiment, when the pre-obtained information includes a pre-established evaluation criteria, the server 700 further includes an establishing unit 702 configured to establish said evaluation criteria. In this embodiment, the establishing unit 702 is optional, which is denoted by dotted lines in FIG. 7. The structure of the establishing unit 702 of this embodiment will be illustrated below.

Figure 8:
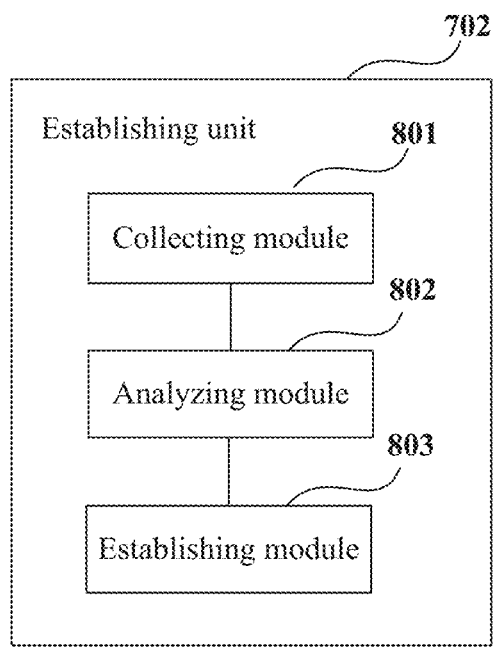
FIG. 8 is a schematic diagram of the structure of an establishing unit 702 of Embodiment 3 of the present disclosure.

FIG. 8 is a schematic diagram of the structure of the establishing unit 702 of this embodiment. As shown in FIG. 8, the establishing unit 702 includes a collecting module 801, an analyzing module 802 and an establishing module 803.

The collecting module 801 is configured to collect information on preference of an image of at least one user.

The analyzing module 802 is configured to statistically analyze the collected information on preference of an image of at least one user.

The establishing module 803 is configured to establish the evaluation criteria according to an analysis result of the analyzing module.

In this embodiment, methods for collecting information on preference by the collecting module 801, analyzing the collected information on preference by the analyzing module 802, and establishing the evaluation criteria according to an analysis result of the establishing module 803, are identical to what are described in Embodiment 1, which shall not be described herein any further.

In this embodiment, the description is illustrated taking a preview image as the image to be evaluated. However, a type of the image to be evaluated is not limited in the embodiments of the present disclosure.

Figure 9:
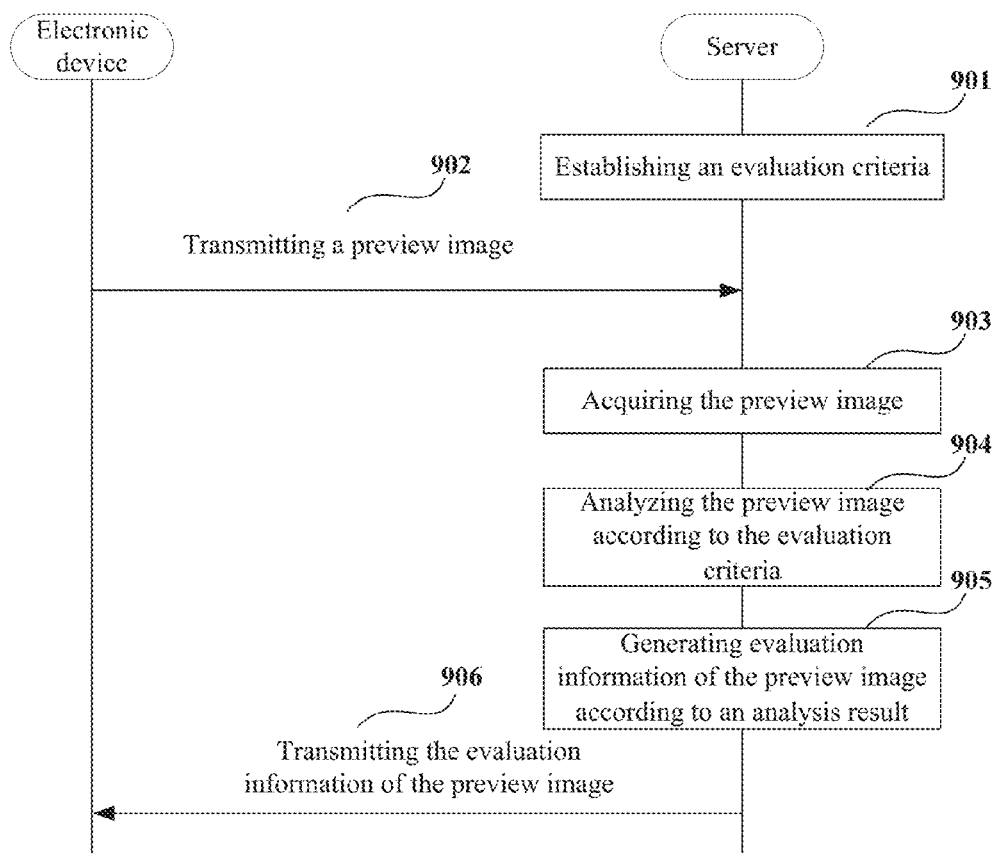
FIG. 9 is a flowchart of a method for generating evaluation information by the server of Embodiment 3 of the present disclosure.

FIG. 9 is a flowchart of a method for generating evaluation information by using the server of this embodiment. As shown in FIG. 9, the method includes:

step 901: establishing an evaluation criteria;

step 902: transmitting a preview image by the electronic device to the server;

step 903: acquiring the preview image by the server;

step 904: analyzing the preview image according to the evaluation criteria;

step 905: generating evaluation information of the preview image according to the analysis result; and step 906: transmitting the evaluation information of the preview image by the server to the electronic device.

In this embodiment, methods for establishing the evaluation criteria, acquiring the preview image, analyzing the preview image according to the evaluation criteria, and generating evaluation information of the preview image according to the analysis result, are identical to what are described in Embodiment 1, which shall not be described herein any further.

In this embodiment, the server 700, for example, may further include a related information generating unit configured to generate related information on a photographed object in the preview image according to the analysis result of the preview image obtained according to the evaluation criteria. For example, if a photographed object in the preview image includes a bag of a certain brand, and the analysis result shows that a friend of the user likes the bag of the brand, related information on the bag of the brand in the preview image may be generated, for reference by the user. Herein, the related information may be obtained by using an existing method, such as being obtained by being linked to a network for search.

It can be seen from the above embodiment that the preview image may be analyzed according to the pre-obtained information, and evaluation information of the preview image may be generated according to the analysis result. In this way, the evaluation information may be provided to a user for reference before shooting and/or publishing a photo, so that the user may adjust a content and/or a parameter of shooting, decide whether to shoot and/or publish the photo, and decide people to whom the photo is published, thereby improving user experiences.

Embodiment 4

An embodiment of the present disclosure further provides a generation method for evaluation information. As a principle of the method for solving problems is similar to those of the function of the components of the generation apparatus for evaluation information of Embodiment 1, the implementation of the generation apparatus for evaluation information of Embodiment 1 may be referred to for the implementation of the method, and identical parts shall not be described herein any further.

Figure 10:
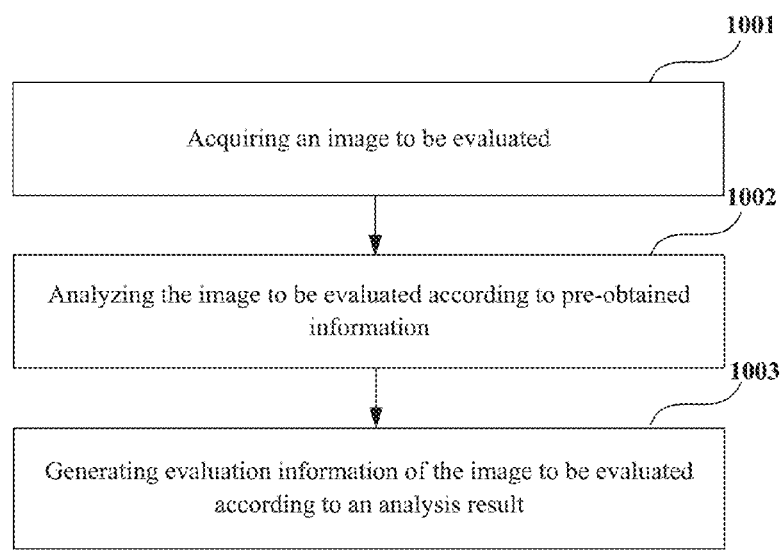
FIG. 10 is a flowchart of a method for generating evaluation information of Embodiment 4 of the present disclosure.

FIG. 10 is a flowchart of the generation method for evaluation information of this embodiment. As shown in FIG. 10, the method includes:

step 1001: acquiring an image to be evaluated;

step 1002: analyzing the image to be evaluated according to pre-obtained information; and step 1003: generating evaluation information of the image to be evaluated according to an analysis result.

In this embodiment, methods for acquiring the image to be evaluated, analyzing the image to be evaluated according to the pre-obtained information, and generating evaluation information of the image to be evaluated according to an analysis result, are identical to what are described in Embodiment 1, which shall not be described herein any further.

It can be seen from the above embodiment that the preview image may be analyzed according to the pre-obtained information, and evaluation information of the preview image may be generated according to an analysis result. In this way, the evaluation information may be provided to a user for reference before shooting and/or publishing a photo, so that the user may adjust a content and/or a parameter of shooting, decide whether to shoot and/or publish the photo, and decide people to whom the photo is published, thereby improving user experiences.

For example, in a mode of implementation of this embodiment, the step of analyzing the image to be evaluated according to pre-obtained information may include:

identifying the image to be evaluated, so as to obtain related information of the image to be evaluated; comparing the related information of the image to be evaluated and the pre-obtained information, so as to obtain a matching degree between the related information of the image to be evaluated and the pre-obtained information; and generating the evaluation information of the image to be evaluated according to the matching degree between the related information of the image to be evaluated and the pre-obtained information.

In a mode of implementation of this embodiment, the method may further include: filtering the generated evaluation information of the image to be evaluated according to a predefined rule.

In a mode of implementation of this embodiment, the pre-obtained information may include a pre-established evaluation criteria, the pre-established evaluation criteria being established by statistically analyzing information on preference of an image of at least one user.

In a mode of implementation of this embodiment, the related information of the image to be evaluated may include at least one of a content, a color, a color temperature, a contrast, a composition, brightness, and saturation, of the preview image.

In a mode of implementation of this embodiment, the information on preference of an image of at least one user may include information on preference of at least one of a content, a color, a color temperature, a contrast, a composition, brightness, and saturation, of an image.

An embodiment of the present disclosure further provides a computer-readable program, which, when being executed in a generation apparatus for evaluation information or an electronic device or a server, will enable the computer to carry out the generation method for evaluation information as described in Embodiment 4 in the generation apparatus for evaluation information or the electronic device or a server.

An embodiment of the present disclosure further provides a storage medium in which a computer-readable program is stored, wherein the computer-readable program enables the computer to carry out the generation method for evaluation information as described in Embodiment 4 in a generation apparatus for evaluation information or an electronic device or a server.

The above apparatuses and methods of the present disclosure may be implemented by hardware, or by hardware in combination with software. The present disclosure relates to such a computer-readable program, which, when being executed by a logic device, will enable the logic device to implement the apparatus or components as described above, or to carry out the methods or steps as described above.

The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

The invention claimed is:

1. A generation apparatus for evaluation information, comprising:

an acquiring circuit configured to acquire an image to be evaluated;

an analyzing circuit configured to analyze the image to be evaluated according to pre-obtained information that includes a pre-established evaluation criteria, the pre-established evaluation criteria being established by statistically analyzing information on preference of an image of at least one user; and a generating circuit configured to generate evaluation information of the image to be evaluated according to an analysis result of the analyzing circuit, wherein the pre-established evaluation criteria corresponds to at least one of a photographing skill of the at least one user or a photographing habit of the at least one user.

2. The apparatus according to claim 1, wherein the analyzing circuit comprises:

an identifying circuit configured to identify the image to be evaluated, so as to obtain related information of the image to be evaluated; and a comparing circuit configured to compare the related information of the image to be evaluated and the pre-obtained information, so as to obtain a matching degree between the related information of the image to be evaluated and the pre-obtained information;

and wherein the generating circuit is further configured to generate the evaluation information of the image to be evaluated according to the matching degree between the related information of the image to be evaluated and the pre-obtained information.

3. The apparatus according to claim 2, wherein the related information of the image to be evaluated comprises at least one of a content, a color, a color temperature, a contrast, a composition, brightness, and saturation, of the acquired image.

4. The apparatus according to claim 1, further comprising:

a filtering circuit configured to filter the generated evaluation information of the image to be evaluated according to a predefined rule.

5. The apparatus according to claim 1, wherein the information on preference of an image of at least one user comprises information on preference of at least one of a content, a color, a color temperature, a contrast, a composition, brightness, and saturation, of an image.

6. An electronic device, comprising:
the apparatus as claimed in claim 5; and
a displaying circuit configured to display the evaluation information of the acquired image on the image to be evaluated.

7. The apparatus according to claim 5, wherein the apparatus forms a portion of a server.

8. An electronic device, comprising:
the apparatus as claimed in claim 1; and
a displaying circuit configured to display the evaluation information of the acquired image on the image to be evaluated.

9. The apparatus according to claim 1, wherein the apparatus forms a portion of a server.

10. The server according to claim 9, further comprising:
an establishing circuit configured to establish an evaluation criteria,
wherein the analyzing circuit is further configured to analyze the image to be evaluated according to the evaluation criteria.

11. The server according to claim 10, wherein the establishing circuit comprises:
a collecting module configured to collect information on preference of an image of at least one user;

an analyzing module configured to statistically analyze the collected information on preference of an image of the at least one user; and an establishing module configured to establish the evaluation criteria according to an analysis result of the analyzing module.

12. The apparatus according to claim 1, wherein the pre-established evaluation criteria comprises a personal profile of the at least one user obtained through statistical analysis.

13. A generation method for evaluation information, comprising:

acquiring an image to be evaluated;

analyzing, use a processor, the image to be evaluated according to pre-obtained information to produce an analysis result, wherein the pre-obtained information comprises a pre-established evaluation criteria, the pre-established evaluation criteria being established by statistically analyzing information on preference of an image of at least one user; and generating, use the processor, evaluation information of the image to be evaluated according to the analysis result, wherein the pre-established evaluation criteria corresponds to at least one of a photographing skill of the at least one user or a photographing habit of the at least one user.

14. The method according to claim 13, wherein the analyzing the image to be evaluated according to pre-obtained information comprises:

identifying the image to be evaluated, so as to obtain related information of the image to be evaluated;

comparing the related information of the image to be evaluated and the pre-obtained information, so as to obtain a matching degree between the related information of the image to be evaluated and the pre-obtained information; and generating the evaluation information of the image to be evaluated according to the matching degree between the related information of the image to be evaluated and the pre-obtained information.

15. The method according to claim 14, wherein the related information of the image to be evaluated comprises at least one of a content, a color, a color temperature, a contrast, a composition, brightness, and saturation, of the preview image.

16. The method according to claim 13, further comprising:

filtering the generated evaluation information of the image to be evaluated according to a predefined rule.

17. The method according to claim 12, wherein the information on preference of an image of at least one user comprises information on preference of at least one of a content, a color, a color temperature, a contrast, a composition, brightness, and saturation, of an image.

18. The method according to claim 13, wherein the pre-established evaluation criteria comprises a personal profile of the at least one user obtained through statistical analysis.

* * * * *